(12) United States Patent
Fox et al.

(10) Patent No.: US 10,606,786 B2
(45) Date of Patent: Mar. 31, 2020

(54) UPGRADABLE VEHICULAR COMPUTING METHODS AND APPARATUSES

(71) Applicant: Intel Corporation, Santa Clara, CA (US)

(72) Inventors: Maik Fox, Karlsruhe (DE); Christian Benkeser, Weingarten (DE); Serdar Gueltekin, Pforzheim (DE); Kurt Herremans, Hasselt (BE); Peter Hall, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/261,209

(22) Filed: Jan. 29, 2019

(65) Prior Publication Data

US 2019/0155778 A1    May 23, 2019

(51) Int. Cl.
*G06F 13/40* (2006.01)
*G06F 13/42* (2006.01)
*G06F 1/26* (2006.01)

(52) U.S. Cl.
CPC .......... *G06F 13/4027* (2013.01); *G06F 1/266* (2013.01); *G06F 13/4282* (2013.01); *G06F 2213/0026* (2013.01); *G06F 2213/0042* (2013.01)

(58) Field of Classification Search
CPC ........ G06F 1/266; G06F 13/4027; G06F 8/60; G06F 8/61; G06F 8/65; G06F 8/656; G06F 8/70; G06F 8/71
See application file for complete search history.

(56) References Cited

U.S. PATENT DOCUMENTS

| | | | | |
|---|---|---|---|---|
| 7,155,321 B2* | 12/2006 | Bromley | ................ | G07C 5/008 701/29.6 |
| 10,007,504 B2* | 6/2018 | Blaschke | .................. | G06F 8/65 |
| 2005/0090942 A1* | 4/2005 | Shi | ............. | G06F 8/60 701/1 |
| 2005/0097541 A1* | 5/2005 | Holland | ................... | G06F 8/65 717/168 |
| 2008/0127160 A1* | 5/2008 | Rackin | ....................... | G06F 8/65 717/168 |
| 2009/0119657 A1* | 5/2009 | Link, II | .................... | G06F 8/64 717/171 |
| 2011/0307336 A1* | 12/2011 | Smirnov | ................... | G06F 8/64 705/14.62 |
| 2011/0307882 A1* | 12/2011 | Shiba | ........................ | G06F 8/65 717/173 |
| 2014/0068596 A1* | 3/2014 | Mota | ........................ | G06F 8/65 717/173 |

(Continued)

*Primary Examiner* — Glenn A. Auve
(74) *Attorney, Agent, or Firm* — Schwabe, Williamson & Wyatt, P.C.

(57) ABSTRACT

Apparatuses, storage media and methods associated with computer assisted or autonomous driving (CA/AD), are disclosed herein. In some embodiments, an apparatus includes an interconnect to mate a pluggable compute module with an in-vehicle compute hub disposed in a vehicle to form an upgradable vehicle compute system for the vehicle, the interconnect having a fixed section and a configurable section. The fixed section includes a dynamic power delivery interface, and a management channel. The configurable section includes a plurality of configurable input/output (I/O) interfaces. Other embodiments are also described and claimed.

25 Claims, 11 Drawing Sheets

(56) References Cited

U.S. PATENT DOCUMENTS

| | | | | |
|---|---|---|---|---|
| 2014/0380296 A1* | 12/2014 | Pal | ............................ | G06F 8/65 |
| | | | | 717/171 |
| 2015/0007155 A1* | 1/2015 | Hoffman | ................... | G06F 8/65 |
| | | | | 717/168 |
| 2015/0154113 A1* | 6/2015 | Krieger | ................... | G06F 8/654 |
| | | | | 711/103 |
| 2015/0230044 A1* | 8/2015 | Paun | ........................ | G06F 8/65 |
| | | | | 455/41.2 |
| 2015/0363210 A1* | 12/2015 | Wehrman | ................. | G06F 8/65 |
| | | | | 701/31.5 |
| 2016/0297301 A1* | 10/2016 | Troemel, Jr. | .............. | G06F 8/65 |
| 2016/0335073 A1* | 11/2016 | Hong | ....................... | G06F 8/65 |
| 2017/0024201 A1* | 1/2017 | Diedrich | .................. | G06F 8/65 |
| 2019/0205115 A1* | 7/2019 | Gomes | ..................... | G06F 8/65 |

\* cited by examiner

UPGRADABLE VEHICULAR COMPUTING METHODS AND APPARATUSES

TECHNICAL FIELD

The present disclosure relates to the field of computer-assisted or autonomous driving (CA/AD). More particularly, the present disclosure relates to upgradeable vehicular compute system (UVCS).

BACKGROUND

To-date, automotive compute systems, e.g. for infotainment and software defined cockpit, are purpose built and fixed to the vehicle they were developed for. This leads to the problem that, once bought, the compute systems available in a given vehicle stay the same over its lifetime. While this was acceptable in the past, where the innovation cycle for these systems was quite long and new features demanding newer hardware took a while to be relevant for the automotive market, this has begun to change already. Customers expect software updates for feature updates and security fixes, as they are used to with their smart phones. Furthermore, car manufacturers begin to understand that up-to-date compute can be a relevant sales advantage on used cars returned from leasing contracts, usually just one to two years old. More than that, while some software upgradeability is given for certain timespan (e.g. 1-2 years) on a fixed compute system, at some point new compute hardware is mandatory to allow the most recent operating systems and software to run.

Within the automotive industry, there has been attempts to provide upgradability to the in-vehicle system. For example, Harman/Daimler "Becker Map Pilot" appears to have once provided a head-less navigation system for Mercedes cars. The idea was to have a small module that can be added by the customer to extend some baseline audio systems with navigation function and map display. The offering appears to be discontinued for current Mercedes models. VW Up!/Skoda CitiGo: "Maps+More" systems appears to have allowed a Navigon brand GPS system or a generic smartphone to be affixed to the dashboard and connected as a companion module to an already present audio system in the car. The smartphone integration appears to rely on Apple CarPlay and Android Auto.

For previous solutions out of the automotive space, there are at least several disadvantages. Prior art attempts to-date tend to use proprietary, fixed interface assignments that are specific to a system. Usually, these interfaces are optimized for the given use case and try to maximize the use of all available interface signals available from the chips used, or they are heavily cost optimized. Either upgradability is not foreseen at all or, due to the reasons stated above, not economically viable. Further, configurability is typically not a part of the designs. The corresponding mainboard/carrier has to be developed against a finished, special module. Newer module generations often need new carrier designs.

Thus, the prior art efforts all fall short of today and future needs for UVCS.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
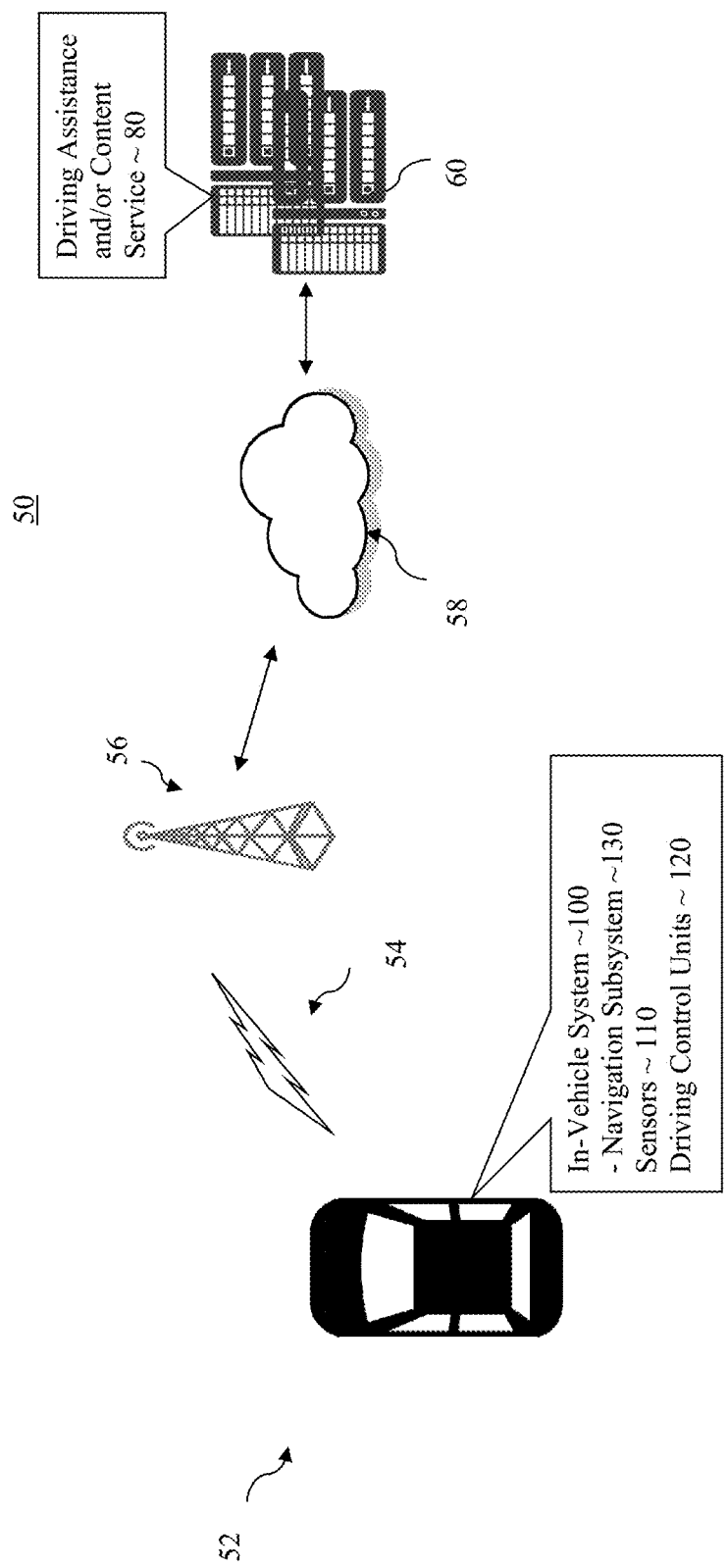
FIG. 1 illustrates an overview of an environment for incorporating and using the UVCS technology of the present disclosure, in accordance with various embodiments.

To address challenges discussed in the background section, a UVCS including in particular a UVCS interface, are disclosed herein. As will be appreciated from the description to follow, inherent to the disclosed interface solution are a set of carefully chosen, configurable high speed interfaces in combination with a management channel and dynamic power delivery. In conjunction, these three pillars provide a flexible, configurable and upgradeable means for operating compute modules in an automotive environment. The interface solution supports module-agnostic implementation of vehicle-bound carrier boards, creating real upgradability and module diversification especially for future generations of compute silicon and serial interface standards.

Aspects of the methods and apparatuses disclosed herein together form a "UVCS interface", a way for allowing future upgradeability and configurability of UVCS in an automotive environment. A new user experience and market models can be created by actually allowing the traditionally static automotive compute systems for infotainment to be upgraded by the means of upgradeable compute modules forming new enhanced instances of the UVCS. The combination of purpose designed and built UVCS hubs and a commodity UVCS module selection may reshape the automotive infotainment and software defined cockpit market, delivering a user experience potentially comparable to a smartphone. The implementation of the "UVCS interface" described herein allows for easy UVCS module integration into diverse UVCS hubs as the hub does not need any knowledge about any specifics of the UVCS module in use, it's just an automotive plug and play experience.

In the following detailed description, these and other aspects of the UVCS technology will be further described. References will be made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

As used herein, the term "module" or "engine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Before describing the UVCS and the UVCS interface in detail, we will first briefly re-visit how current state-of-the-art automotive compute systems (ACS) are developed and how the life and development cycles of cars and silicon compute components are diverging, leading to several problems that have to be solved. A traditional passenger vehicle has an approximate lifetime of 15 years, over which it is expected and mandated by stringent quality control that all major components the car is made of have to perform well over this lifetime without needing to be replaced. Especially for electronic control units (ECU) and infotainment systems, this requirement creates a lot of overhead compared to traditional consumer electronics: besides the lifetime expectations, environmental factors like shock, vibration, humidity and temperature mandate specially qualified components and integration techniques. Of course, this has an impact on development time, integration/validation effort and cost.

A traditional, product cost-optimized Automotive Compute System (ACS) would integrate all the necessary components, including System on Chip (SoC) (integrating central processing unit (CPU) and graphics processing units (GPU)), main memory and everything else on one single mainboard. This is called the "silicon down" approach. However, initial non-recurring engineering (NRE) cost are quite high as reuse is limited and the integration of the high-speed components (SoC and memory) is usually a big effort.

To reduce NRE cost and development cycle time, the straight-forward approach to partition an ACS is to put the high-effort and most generic/reusable components on a module that can be reused over several projects or even be bought from an external vendor. This approach is a recent development in the automotive industry. As this industry is usually a low-margin, cost driven business, the design decisions for modules usually focused on providing the most value to the integration. This is achieved by exposing all or most of the SoC's functionality to the mainboard, leading to interfaces with very high pin count.

Two actual examples are the Intel Crestview Hills Module (230 pin connector for interfaces and additional, specialized power connector) and the Intel Gordon Ridge BGA Module Package (BMP, 2048 balls including interface and power delivery). Both modules are actively in mass production and delivered in cars for infotainment and software defined cockpit applications.

While the "module-down" approach solves certain problems regarding the complexity of integrating current high-speed SoCs and memory, the modules are highly specific to a certain SoC package, type or generation. This requires a dedicated mainboard implementation for the given module/SoC combination. Reuse for another type of SoC or a newer generation SoC or memory is limited. A newer generation module could be built in as "form-fit-function" equivalent to a predecessor. However, this has proven to be very challenging and, to the knowledge of the inventors, has never been productized. For example, if even one detail of pin functionality of a newer generation SoC changed, the module would need to emulate the legacy behavior. This can be impossible, as the module developers cannot possibly know all the dependencies and use cases of all possible customer mainboard implementations.

Beyond signaling and communication interfaces, power delivery is a very important topic. To reduce cost and to comply with all automotive requirements, the power delivery is usually highly specialized, e.g. by having a purpose-developed power management solution for each SoC and memory solution. This leads to specific input voltages, control signals and also current demands the mainboard has to deliver. Thus, power delivery is hindering easy integration of a newer SoC generation into an existing design, even when a module-down approach was followed originally.

Another relevant design constraint for ACS are vehicle power delivery network characteristics. While the nominal voltage for a passenger vehicle's power delivery is 12 V, there are certain, standardized events that systems connected to this supply have to sustain without being damaged and, in most cases, continue to operate without interruption. The three major conditions are:

(a) The so-called "cold crank" scenario: In this scenarios, the engine is started at very low temperatures and due to the internal friction the starter needs dramatically more energy. This causes the power delivery network voltage to drop substantially. It is expected that infotainment and especially software defined cockpit applications are not adversely affected by this event, in case of a start/stop condition no functional impact is allowed at all. The requirements toward this scenario vary over different car manufacturers, but usually a lower limit of 4.5 V is specified to be sufficient (see also ISO 16750-2, Table 3, Level II).

(b) The second scenario occurs when the battery is suddenly disconnected while it's being loaded by the vehicle's alternator. Voltage spikes of up to 87 V (refer to ISO 7637) can happen on 12 V vehicle systems. No damage is allowed to happen.

(c) In the third scenario, the battery is connected in the wrong way, or a cabling/connection error occurs during jump-start or maintenance. The connected systems have to be protected and are not allowed to short-circuit.

Referring now to FIG. 1, wherein an overview of an environment for incorporating and using the UVCS technology of the present disclosure, in accordance with various embodiments, is illustrated. As shown, for the illustrated embodiments, example environment 50 includes vehicle 52. Vehicle 52 includes an engine, transmission, axles, wheels and so forth (not shown). Further, vehicle 52 includes an in-vehicle system 100, sensors 110, and driving control units (DCU) 120. In-vehicle system 100 includes one or more upgradeable vehicle compute systems (UVCS) incorporated with the upgradeable vehicular computing technology of the present disclosure, described more fully below.

In various embodiments, in-vehicle system 100 may include navigation subsystem 130. Navigation subsystem 130 may be configured to provide navigation guidance or control, depending on whether CA/AD vehicle 52 is a computer-assisted vehicle, partially or fully autonomous driving vehicle. Navigation subsystem 130 may be configured with computer vision to recognize stationary or moving objects (such as a traveler or a moving object) in an area surrounding CA/AD vehicle 52, as it travels enroute to its destination. In various embodiments, navigation subsystem 130 may be configured to recognize stationary or moving objects in the area surrounding CA/AD vehicle 52, and in response, make its decision in guiding or controlling DCUs of CA/AD vehicle 52, based at least in part on sensor data collected by sensors 110.

Sensors 110 may include one or more cameras (not shown) to capture images of the surrounding area of CA/AD vehicles 52. In various embodiments, sensors 110 may also include light detection and ranging (LiDAR) sensors, accelerometers, gyroscopes, global positioning system (GPS) circuitry, and so forth. Examples of driving control units (DCU) may include control units for controlling engine, transmission, brakes of CA/AD vehicle 52. In various embodiments, in addition to navigation subsystem 130, in-vehicle system 100 may further include a number of infotainment subsystems/applications, e.g., instrument cluster subsystem/applications, front-seat infotainment subsystem/application, such as, a navigation subsystem/application, a media subsystem/application, a vehicle status subsystem/application and so forth, and a number of rear seat entertainment subsystems/applications (not shown).

In various embodiments, in-vehicle system 100, on its own or in response to user interactions, communicates or interacts 54 with one or more remote/cloud servers 60. In particular, in various embodiments, remote/cloud servers 60 may include any one of a number of driving assistance (such as map) or content provision (such as multi-media infotainment) services 80 known in the art.

In various embodiments, in-vehicle system 100 communicates 54 with server 60 via cellular communication, e.g., via a wireless signal repeater or base station on transmission tower 56 near vehicle 52. Examples of private and/or public wired and/or wireless networks 58 may include the Internet, the network of a cellular service provider, and so forth. It is to be understood that transmission tower 56 may be different towers at different times/locations, as vehicle 52 travels enroute to its destination or personal system 150 moves around. Further, it is noted that while a car is shown as vehicle 52, in other embodiments, vehicle 52 may be a truck, a bus, a boat, a plane, or an unmanned aerial vehicle.

Except for the UVCS technology of the present disclosure provided, in-vehicle system 100 and CA/AD vehicle 52 otherwise may be any one of a number of in-vehicle systems and CA/AD vehicles, from computer-assisted to partially or fully autonomous vehicles, known in the art. These and other aspects of the underlying UVCS technology used to implement in-vehicle system 100 will be further described with references to the remaining Figures.

Figure 2:
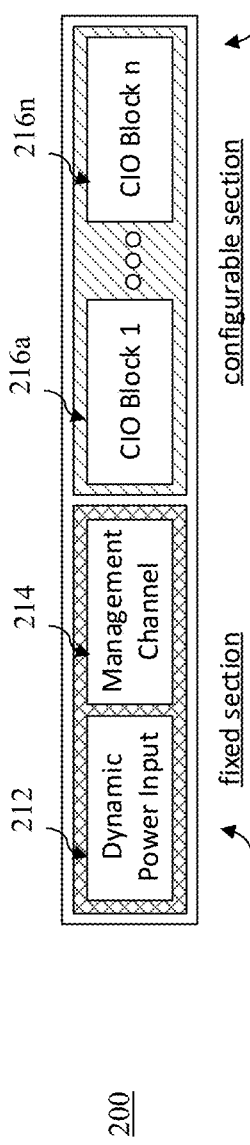
FIG. 2 illustrates the UVCS interface of the present disclosure, according to various embodiments.

Referring now to FIG. 2, wherein the UVCS interface of the present disclosure, according to various embodiments, is illustrated. UVCS interface 200 is a modular system interface designed to couple a pluggable compute module (having compute elements such as CPU, memory, storage, radios, etc.) to an in-vehicle compute hub or subsystem (having peripheral components, such as power supplies, management, I/O devices, automotive interfaces, thermal solution, etc) pre-disposed in a vehicle to form an instance of a UVCS for the vehicle. Different pluggable compute modules having different compute elements, or compute elements of different functionalities or capabilities, may be employed to mate with an in-vehicle compute hub/subsystem pre-disposed in the vehicle, forming different instances of UVCS. Accordingly, the computing capability of a vehicle having a pre-disposed in-vehicle compute hub/subsystem may be upgraded by having a newer, more function or more capable pluggable compute module be mated with the pre-disposed in-vehicle compute hub/subsystem, replacing a prior older, less function or less capable pluggable compute module.

As shown, for the illustrated embodiments, UVCS 200 includes a fixed section 202 and a configurable section 204. Fixed section 202 includes a dynamic power input interface 212 (also referred to as dynamic power delivery interface), and a management channel interface 214. Configuration section 204 includes a number of configurable I/O (CIO) blocks 216a-216n.

Dynamic power input interface 212 is arranged to deliver power from the in-vehicle compute hub/subsystem to the compute elements of a pluggable compute module plugged into UVCS interface 200 to mate with the in-vehicle compute hub to form an instance of an UVCS. Management channel interface 214 is arranged to facilitate the in-vehicle compute hub in managing/coordinating the operations of itself and the pluggable compute module plugged into UVCS interface 200 to form the instance of an UVCS. CIO blocks 216a-216n are arranged to facilitate various I/O between various compute elements of the pluggable compute module and the peripheral components of the in-vehicle compute hub/subsystem mated to each other through UVCS interface 200 to form the instance of an UVCS. The I/O between the compute elements of the pluggable compute module and the peripheral components of the mated in-vehicle compute hub/subsystem vary from instance to instance, depending on the compute elements of the pluggable compute module used to mate with the in-vehicle compute hub to form a particular instance of the UVCS. In various embodiments, at least some of CIO blocks 216a-216a are arranged to facilitate high-speed interfaces.

In various embodiments, the CIO blocks 216a-216n represent a set of electrically similar high speed, differential serial interfaces, allowing a configuration of the actually used interface type and standard on a case-by-case basis. This way, different UVCS compute hubs can connect different peripherals to the same UVCS interface 200, and allow the different peripherals to perform I/O operations in different I/O protocols with compute elements of a UVCS module.

The number of CIO blocks 216a-216n may vary from embodiments to embodiments for different market segments. For example, there may be few CIO blocks 216a-216n, like 2 to 4, for an embodiment designed for the lower end markets. On the other hand, in another example, there may be many more CIO blocks 216-216n, like 8 to 16, for an embodiment designed for the higher end markets. However, to achieve the highest possible interoperability and upgradeability, for a given UVCS generation, the number and functionality/configurability of the number of CIO blocks may be kept the same.

Figure 3:
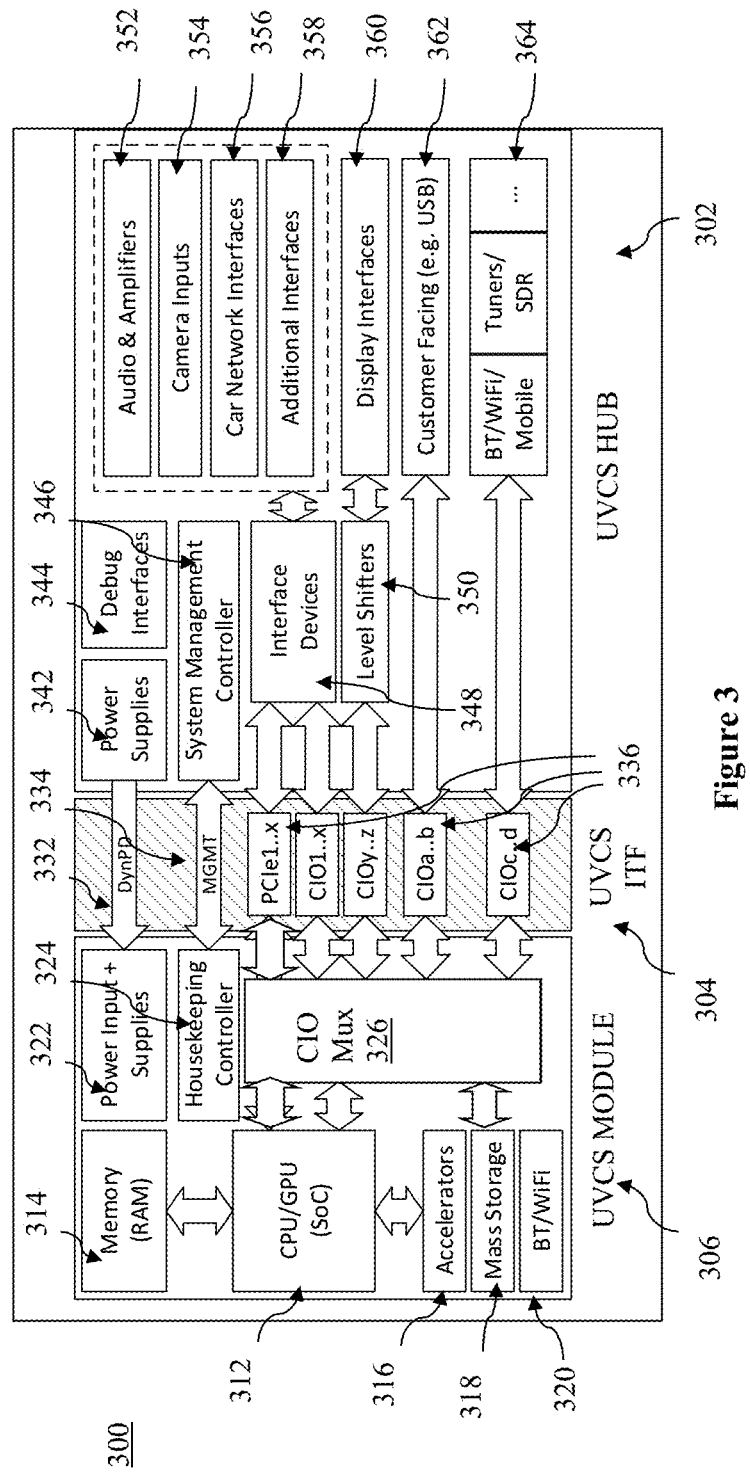
FIG. 3 illustrates an example UVCS formed using the UVCS interface of the present disclosure, according to various embodiments.

Referring now to FIG. 3, wherein an example UVCS formed using the UVCS interface of the present disclosure, according to various embodiments, is illustrated. As shown, UVCS interface 304, which may be UVCS interface 200, is used to facilitate mating of pluggable UVCS module 306 with UVCS hub 302 pre-disposed in a vehicle, to form UVCS 300 for the vehicle, which may be one of the one or more UVCS of in-vehicle system 100 of FIG. 1. UVCS interface 304, as UVCS interface 200, includes a fixed section and a configurable section. The fixed section includes a dynamic power delivery interface (DynPD) 332 and a management channel (MGMT) interface 334. The configurable section includes a number of configurable I/O interfaces 336, PCIe1 . . . x, CIO1 . . . x, CIOy . . . z, CIOa . . . b, CIOc . . . d.

Pre-disposed UVCS hub 302 includes power supplies 342 and system management controller 346. Further, for the illustrated embodiments, UVCS hub 302 includes debug interfaces 344, interface devices 348, level shifters 350, and a number of peripheral components 352-364, such as audio and amplifiers 352, camera interface 354, car network interfaces 356, other interfaces 358, display interfaces 360, customer facing interfaces (e.g., a Universal Serial Bus (USB) interface) 362, and communication interfaces 364 (e.g., BlueTooth® (BT), WiFi, other mobile interfaces, tuners, software define radio (SDR)), coupled to power supplies 342, system management controller 346, and each other as shown. In other embodiments, UVCS hub 302 may include more or less, or different peripheral elements.

Pluggable UVCS module 306 includes CPU/GPU (e.g., in a SoC) 312, memory 314, power input+supplies circuitry 322, housekeeping controller 324 and CIO multiplexer (Mux) 326. Further, for the illustrated embodiments, UVCS module 306 includes hardware accelerators 316, persistent mass storage 316 and communication modules (e.g., BT, WiFi), coupled to the earlier enumerated elements and each other as shown. In other embodiments, UVCS module 306 may include more or less, or different compute elements.

Power Supplies 342 of UVCS hub 302 delivers power to compute elements of UVCS module 306, via DynPD 332 of UVCS interface 302 and Power Input+Supplies circuitry 322 of UVCS module 306. System management controller 346 of UVCS hub 302 manages and coordinates its operations and the operations of the compute elements of UVCS module 306 via the management channel 334 of UVCS interface 302 and housekeeping controller 324 of UVCS module 306. CIO multiplexer 326 is configured to provide a plurality of I/O channels of different I/O protocols between the compute elements of UVCS module 306 and the peripheral components of UVCS hub 302, via the configurable I/O blocks 336 of UVCS interface 304, interface devices 348 and level shifters 350 of UVCS hub 302. For example, one of the I/O channels may provide for I/O between the compute elements of UVCS module 306 and the peripheral components of UVCS hub 302 in accordance with PCIe I/O protocol. Another I/O channel may provide for I/O between the compute elements of UVCS module 306 and the peripheral components of UVCS hub 302 in accordance with USB I/O protocol. Still other I/O channels provide for I/O between the compute elements of UVCS module 306 and the peripheral components of UVCS hub 302 in accordance with other high speed serial or parallel I/O protocols.

DynPD 332, management channel 334, and CIO I/O blocks 336 of UVCS interface 304, power supplies 342 and system management controller 346 of UVCS hub 302, and power input+supplies circuitry 322, housekeeping controller 324 and CIO multiplexer 326 of UVCS 306 will be further described below with references to FIGS. 4-7

Figure 4:
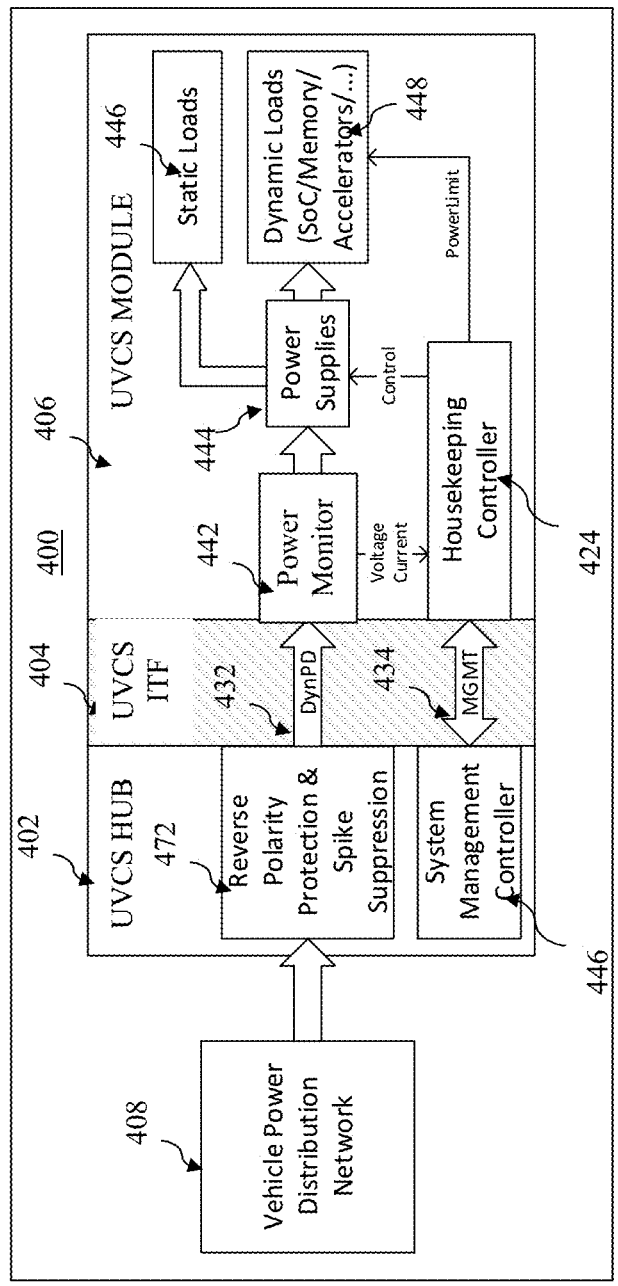
FIG. 4 illustrates an example power arrangement when using the UVCS interface of the present disclosure, according to various embodiments.

Referring now to FIG. 4, wherein an example power arrangement when using the UVCS interface of the present disclosure, according to various embodiments, is illustrated. As shown, UVCS 400, which may be one of the one or more UVCS of in-vehicle system 100 of FIG. 1 or UVCS 300 of FIG. 3, is formed by mating UVCS module 406 with pre-disposed UVCS hub 402, via UVCS interface 404. UVCS interface 404, similar to UVCS interface 200 or 304, includes a fixed section having a dynamic power delivery interface (DynPD) 432 and a management channel 434. UVCS hub 402 includes system management controller 446, and power supply circuitry 472, which includes in particular, reverse polarity protection and spike suppression circuitry, coupled with UVCS interface 404 and the power distribution network 408 of the vehicle, as shown. UVCS module 406 includes power input+supplies circuitry having power monitor portion 442 and a power supply portion 444, housekeeping controller 424, and various dynamic and static loads 448 and 446, coupled to each other and the UVCS interface 404, as shown. Examples of dynamic loads may include SoC, Memory, hardware accelerator and so forth.

System management controller 446 of UVCS hub 402 and housekeeping controller 424 of UVCS module 406 are configured to negotiate, during an initial pairing of the UVCS hub 402 and UVCS module 406 a power budget or contract. In various embodiments, the power budget/contract may provide for minimum and maximum voltages, current/power needs of UVCS module 406 and the current power delivery limitation of UVCS interface 404, if any. This allows for the assessments of the compatibility of a given pair of UCS hub and module 402 and 406, as well as for operational benefits. For example, a UVCS module input voltage range of 4.5-18 V could be defined/negotiated, with a limitation of maximum current of 10 A for the UVCS interface and a UVCS module power need of 70 W peak. Here, the UVCS module power cannot be provided if the input voltage drops below 7V, in this case the current would exceed the limitation of the connector (10 A). Furthermore, UVCS hub 402 could impose a maximum power or current limit onto UVCS module 406 to manage its own power consumption, either dynamically or statically.

Continuing to refer to FIG. 4, power circuitry 472 of UVCS hub 402, thereafter supplies power to UVCS module 406, via DynPD 432 as negotiated. Power monitor 442 of UVCS module 406 monitors the power received from UVCS hub 402, and reports results of the monitoring, such as the voltage, current and other attributes of the power received to housekeeping controller 424. Housekeeping controller 424, in turn, controls power supply circuitry 444 in its delivery of power to static and dynamic loads 446 and 448, as well as the consumption of power by static and dynamic loads 446 and 448, based at least in part on the negotiated power budget/contract during initial pairing, as well as the dynamic reporting of the results of the power monitoring from power monitor 442.

In various embodiments, housekeeping controller 424 is further configured to control power supply circuitry 444 in its delivery of power to static and dynamic loads 446 and 448, as well as the consumption of power by static and dynamic loads 446 and 448, based on the operating context of the vehicle, e.g., whether the vehicle is in a "cold crank" or "cold start" scenario. In various embodiments, housekeeping controller 424 is configured to control power consumption of static and dynamic loads 446 and 448, by selectively initiating sleep states, lowering clock frequencies, or powering off the static and dynamic loads 446 and 448.

Thus, by locating costly and big protection components (reverse polarity protection, spike suppression, etc) on UVCS hub 402, while potentially avoiding a boost-converter on UVCS hub 402, negotiating power and voltage needs and limits (during the initial pairing phase between UCS module and hub 402 and 406), monitoring the input voltage and current to UVCS module 406 and dynamically limiting the power consumption of UVCS module 406 in special events like a cold-crank scenario, the power may be provided to UVCS 400 in a less costly manner, while keeping availability of UVCS 400 at the same level.

Figure 5:
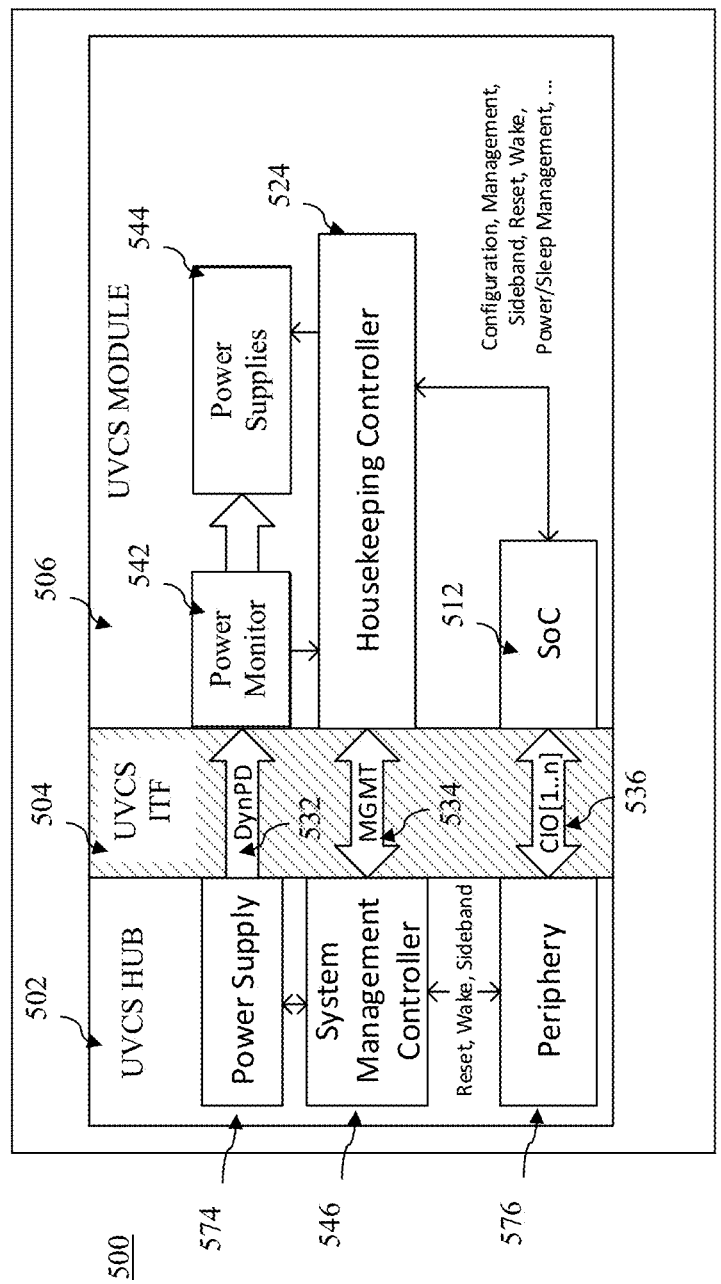
FIG. 5 illustrates an example management channel arrangement when using the UVCS interface of the present disclosure, according to various embodiments.

Referring now to FIG. 5, wherein an example management channel arrangement when using the UVCS interface of the present disclosure, according to various embodiments, is illustrated. As shown, UVCS 500, which may be one of the one or more UVCS of in-vehicle system 100 of FIG. 1, UVCS 300 of FIG. 3, or UVCS 400 of FIG. 4, is formed by mating UVCS module 506 with pre-disposed UVCS hub 502, via UVCS interface 504. UVCS interface 504, similar to UVCS interface 200, 304 or 404, includes a fixed section having a dynamic power delivery interface (DynPD) 532, a management channel 534, and a configurable section having one or more configurable I/O blocks 536. UVCS hub 502 includes system management controller 546, power supply circuitry 574 and one or more peripheral components 576, coupled to each other and UVCS interface 503, as shown. UVCS module 506 includes power input+supplies circuitry having power monitor portion 542 and a power supply portion 544, housekeeping controller 524, and various dynamic and static loads, such as SoC 512, coupled to each other and the UVCS interface 504, as shown.

In various embodiments, management channel 534 is a small low pin count serial interface. In some embodiments, management channel 534 is a Universal Asynchronous Receiver/Transmitter (UART) interface or a USB interface. In alternate embodiments, management channel 534 may be a parallel interface.

In various embodiments, housekeeping controller 524 and system management controller 546 are respectively configured to authenticate to each other through management channel 534. Authentication may be conducted in accordance with any one of a number of authentication protocol known in the art. Further, in various embodiments, housekeeping controller 524 and system management controller 546 are respectively configured for housekeeping controller 524 to provide I/O configuration information to system management controller 546 through management channel 534, to allow system management controller 546 to configure the I/O blocks to provide the I/O channels with the appropriate I/O protocols as needed by UVCS module 506 and/or UVCS hub 502. Still further, in various embodiments, housekeeping controller 524 and system management controller 546 are respectively configured to allow programming and debugging of UVCS hub and module 502 and 506, as well as implement one or more vehicular functional safety protocols, through management channel 534.

In various embodiments, housekeeping controller 524 is configured to abstract power and sleep management related signals of the SoC 512 and other compute elements, and communicate power and sleep management related information of SoC 512 and other compute elements to UVCS module 506, through management channel 534, in a form independent of the specific SoC 512 and the other compute elements included with the UVCS module 506. Further, in various embodiments, housekeeping controller 524 is configured to channel sideband signals from SoC 512 or other compute elements to peripherals 576 of UVCS hub 502, through management channel 534. Still further, in various embodiments, housekeeping controller 524 is configured to transfer operational/environmental data of UVCS module 506 (such as temperatures, fan speeds, current power consumption, etc.) for the controlling the thermal solution/cooling system (not shown) of UVCS hub 502.

In various embodiments, system management controller 546 is configured to communicate UVCS hub's monitoring of the vehicle's power distribution to housekeeping controller 524, allowing housekeeping controller 524 to manage UCVS module 506 in response to certain automotive specific scenarios, such as sudden power loss.

Figure 6:
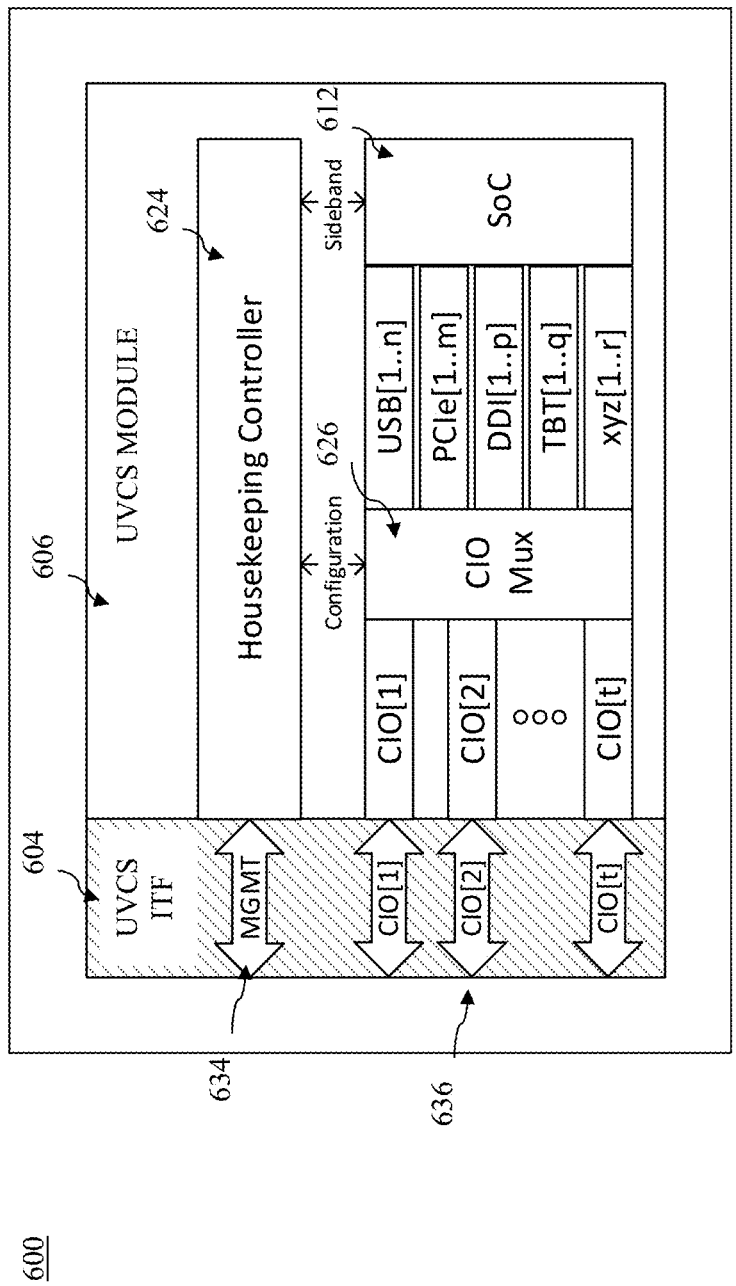
FIG. 6 illustrates an example configurable input/output (I/O) arrangement of a UVCS, according to various embodiments.

Referring now to FIG. 6, wherein an example configurable input/output (I/O) arrangement of a UVCS, according to various embodiments, is illustrated. As shown, UVCS 600, which may be one or more one or more UVCS of in-vehicle system 100 of FIG. 1, UVCS 300 of FIG. 3, UVCS 400 of FIG. 4, or UVCS 500 of FIG. 5, is formed by mating UVCS module 606 with a pre-disposed UVCS hub (not shown), via UVCS interface 604. As earlier described, UVCS interface 604, similar to UVCS interface 200, 304, 404 or 504, includes a fixed section having a dynamic power delivery interface (DynPD) (not shown), a management channel 634, and a configurable section having one or more configurable I/O blocks 636. UVCS module 606 includes housekeeping controller 624, CIO multiplexor 626, SoC 612, and other compute elements (not shown), coupled to each other and the UVCS interface 604, as shown.

As described earlier, the configurable I/O (CIO) blocks 636 represent a set of electrically similar high speed interfaces, e.g., high speed differential serial interfaces, allowing a configuration of the actually used interface type and standard on a case-by-case basis. In particular, for the illustrated embodiments, housekeeping controller 624 is arranged to configure CIO multiplexer 626 to provide a plurality of I/O channels through the various CIO blocks 636 to facilitate I/O operations in different I/O protocols. For the illustrated embodiments, the plurality of I/O channels include a USB I/O channel, a PCIe I/O channel, a HDMI and DP (DDI) I/O channel, and a Thunderbolt (TBT) I/O channel. The plurality of I/O channels may also include other I/O channel types (xyz [1 . . . r]) beside the enumerated I/O channel types.

In various embodiments, CIO multiplexer 626 comprises sufficient circuit paths to be configurable to multiplex any given combination of I/O interfaces exposed by SoC 612 to any of the CIO blocks 636 connected. In alternate embodiments, CIO multiplexer 626 may merely support a limited multiplexing scheme. In particular, CIO multiplexer 626 may provide a limited multiplexing scheme if CIO blocks 636 support a limited number of I/O protocols, e.g., supporting display interfaces and Thunderbolt, while not offering PCIe support. In various embodiments, CIO Mux 626 may be integrated as part of SoC 612.

Figure 7:
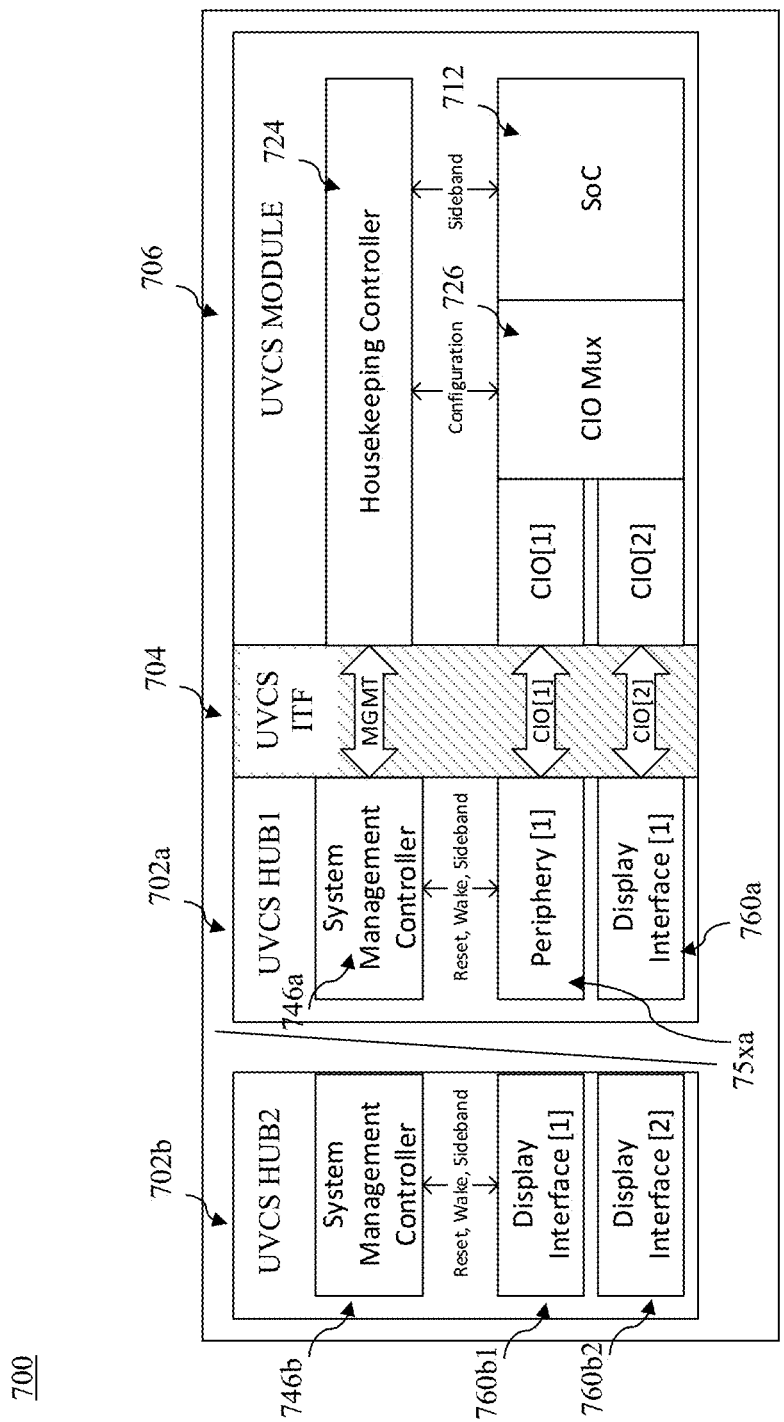
FIG. 7 illustrates another example configurable input/output (I/O) arrangement of a UVCS, according to various embodiments.

FIG. 7 illustrates another example configurable input/output (I/O) arrangement of a UVCS, according to various embodiments. As shown, UVCS 700, which may be one of the one or more UVCS of in-vehicle system 100 of FIG. 1, UVCS 300 of FIG. 3, UVCS 400 of FIG. 4, UVCS 500 of FIG. 5 or UVCS 600 of FIG. 6, is formed by mating UVCS module 706 with a pre-disposed UVCS hub 702a or 702b, via UVCS interface 704. UVCS interface 704, similar to UVCS interface 200, 304, 404, 504 or 604, includes a fixed section having a dynamic power delivery interface (DynPD) (not shown), a management channel, and a configurable section having one or more configurable I/O blocks. UVCS module 706 includes housekeeping controller 724, CIO multiplexor 726, SoC 712, and other compute elements (not shown), coupled to each other and the UVCS interface 704, as shown. UVCS hub 702a or 702b includes system management controller 746a or 746b. For UVCS hub 702a, it further includes display interface 760a and other peripherals 75xa, whereas for UVCS 702b, it further includes at least two display interfaces 760b1 and 760b2.

Thus, leveraging on the novel arrangement of UVCS interface 704, housekeeping controller 724 configures CIO multiplexor 726 to provide at least two I/O channels for two I/O protocols for I/O operations with peripheral 75xa and display interface 760a, through CIO blocks CIO[1] and CIO[2] of UVCS interface 704, when UVCS hub 702a is mated to UVCS interface 704 to form UVCS 700 with UVCS hub 702a. However, housekeeping controller 724 configures CIO multiplexor 726 to provide at least two I/O channels for two I/O protocols for I/O operations with two display interfaces 760a and 760b through the same CIO blocks CIO[1] and CIO[2] of UVCS interface 704, when UVCS hub 702b is mated to UVCS interface 704 to form UVCS 700 with UVCS hub 702b.

Thus, upgradeability of vehicular computing is advantageously achieved by selecting interface standards that have a proven forward and backwards compatibility, like the already mentioned USB, PCIe and Display Port (DP). Also, the electrical interface definition can be limited to specifying the number of differential receive and transmit pairs and a number of flexible sideband signals per CIO block. Several classes or types of CIO block are also feasible, but their number may be kept low to not create unnecessary pin assignment and upgrade problems. The CIO blocks together with tunneling sideband signals through the management channel (as described earlier) delivers the means to use one interface design and a limited amount of UVCS module variants over a very broad range of custom and tailored UVCS hubs.

Figure 8:
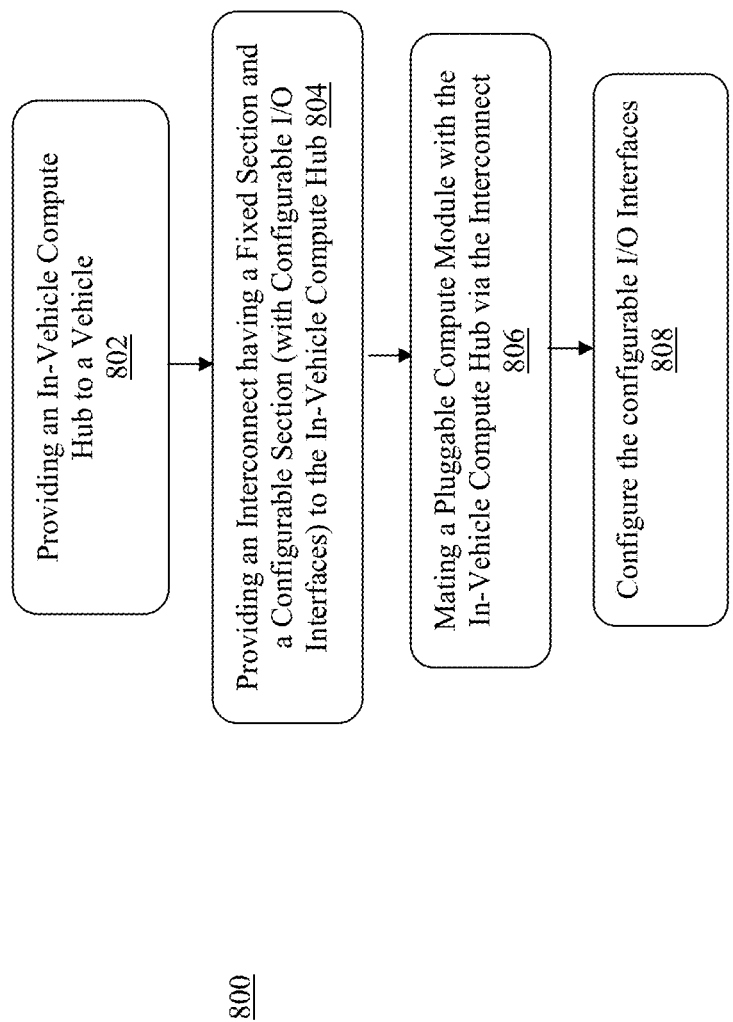
FIG. 8 illustrates an upgradeable vehicular computing method, according to various embodiments.

Referring now to FIG. 8, wherein an upgradeable vehicular computing method, according to various embodiments, is illustrated. As shown, method 800 includes operations performed at blocks 802-808. In alternate embodiments, method 800 may include more or less operations, or having the operations performed in a different order.

Method 800 begins at block 802. At block 802, an in-vehicle compute hub, such as UVCS hub 302, 402, 502, or 702 is provided to or disposed in a vehicle. Next at block 804, an interconnect having a fixed section and a configurable section, as earlier described, such as UVCS interface 200, 304, 404, 504, 604 or 704, is provided or mated with the pre-disposed in-vehicle compute hub (UVCS hub).

At block 806, a pluggable compute module, such as UVCS module 306, 406, 506, 606 or 706 is provided or mated with the in-vehicle compute hub (UVCS hub), via the interconnect (UVCS interface), forming an instance of a UVCS. At block 808, on authentication and/or confirmation of compatibility, the CIO blocks of the UVCS interface and the CIO multiplexer of the pluggable compute module are configured to provide a plurality of I/O channels for a plurality of I/O protocols to facilitate I/O between the peripherals of the in-vehicle compute hub and the compute elements of the pluggable compute module. Thereafter, power may be supplied from the UVCS hub to the UVCS module, and the formed UVCS proceeds into operation. In various embodiments, on failure of authentication or compatibility confirmation, the UVCS hub may refrain from supplying power to the UVCS module, resulting in no operable UVCS being formed.

During the life of the vehicle, operations at blocks 806 and 808 may be repeated to replace an older pluggable compute module with a newer, more function or more capable pluggable compute module to upgrade the UVCS of the vehicle.

Figure 9:
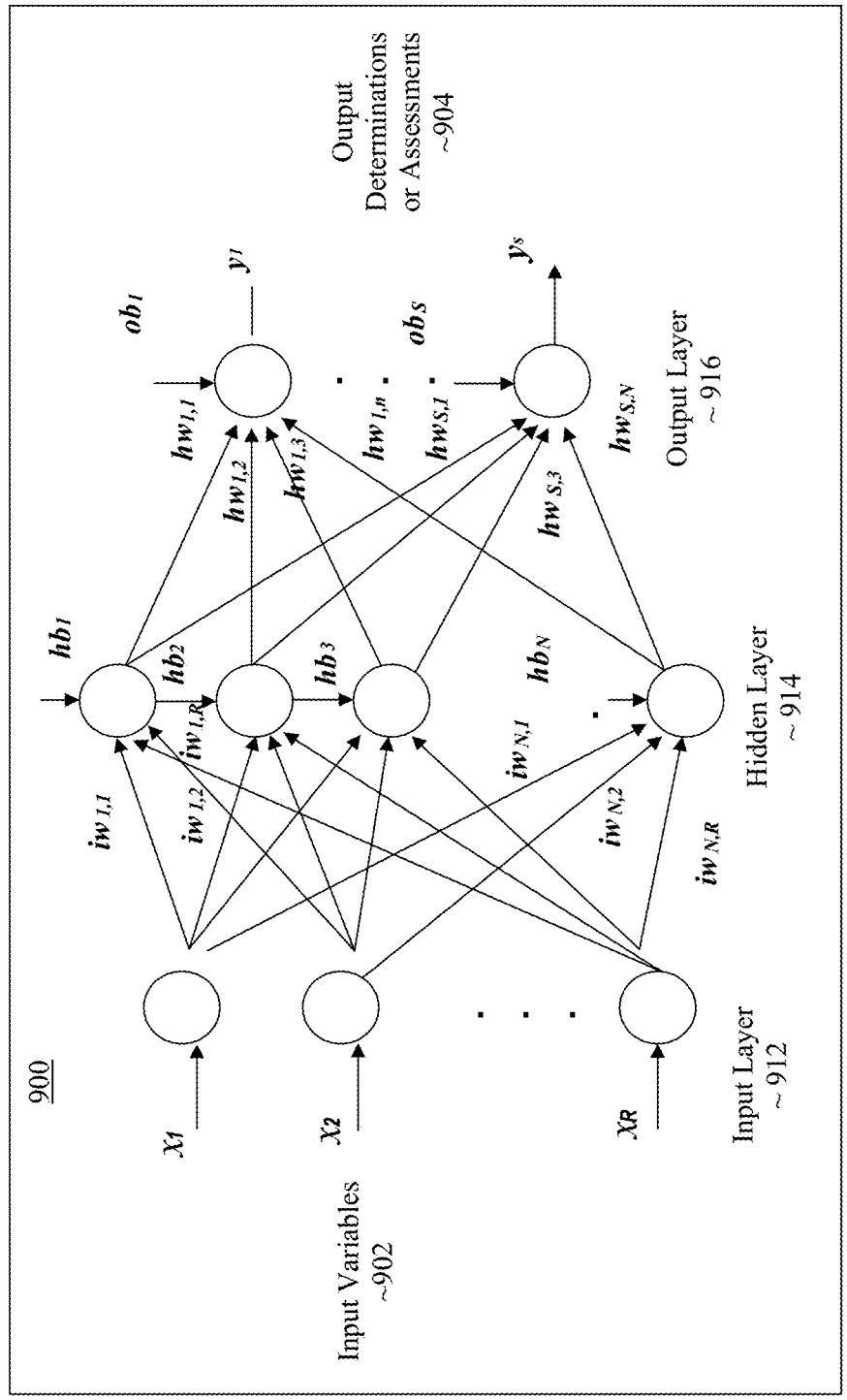
FIG. 9 illustrates an example neural network suitable for use by the UVCS, according to various embodiments.

Referring now to FIG. 9, wherein an example neural network suitable for use by a UVCS, in accordance with various embodiments, is shown. Example neural network 900 may be suitable for use e.g., by navigation subsystem 130 of FIG. 1, implemented in part by a hardware accelerator of a UVCS module. As shown, example neural network 900 may be a multilayer feedforward neural network (FNN) comprising an input layer 912, one or more hidden layers 914 and an output layer 916. Input layer 912 receives data of input variables ($x_i$) 902. Hidden layer(s) 914 processes the inputs, and eventually, output layer 916 outputs the determinations or assessments ($y_i$) 904. In one example implementation the input variables ($x_i$) 902 of the neural network are set as a vector containing the relevant variable data, while the output determination or assessment ($y_i$) 904 of the neural network are also as a vector.

Multilayer feedforward neural network (FNN) may be expressed through the following equations:

$$ho_i = f(\Sigma_{j=1}^{R}(iw_{i,j} x_j) + hb_i), \text{ for } i=1, \ldots, N$$

$$y_i = f(\Sigma_{k=1}^{N}(hw_{i,k} ho_k) + ob_i), \text{ for } i=1, \ldots, S$$

where $ho_i$ and $y_i$ are the hidden layer variables and the final outputs, respectively. f( ) is typically a non-linear function, such as the sigmoid function or rectified linear (ReLu) function that mimics the neurons of the human brain. R is the number of inputs. N is the size of the hidden layer, or the number of neurons. S is the number of the outputs.

The goal of the FNN is to minimize an error function E between the network outputs and the desired targets, by adapting the network variables iw, hw, hb, and ob, via training, as follows:

$$E = \Sigma_{k=1}^{m}(E_k), \text{ where } E_k = \Sigma_{p=1}^{S}(t_{kp} - y_{kp})^2$$

where $y_{kp}$ and $t_{kp}$ are the predicted and the target values of pth output unit for sample k, respectively, and m is the number of samples.

For navigation subsystem 130, input variables ($x_i$) 902 may include various sensor data collected by various vehicles sensors, as well as data describing relevant factors to a decision. The output variables ($y_i$) 904 may include determined response, e.g., adjusting speed, braking, changing lane, and so forth. The network variables of the hidden layer(s) for the neural network, are determined by the training data.

In the example of FIG. 9, for simplicity of illustration, there is only one hidden layer in the neural network. In some other embodiments, there can be many hidden layers. Furthermore, the neural network can be in some other types of topology, such as Convolution Neural Network (CNN), Recurrent Neural Network (RNN), and so forth.

Figure 10:
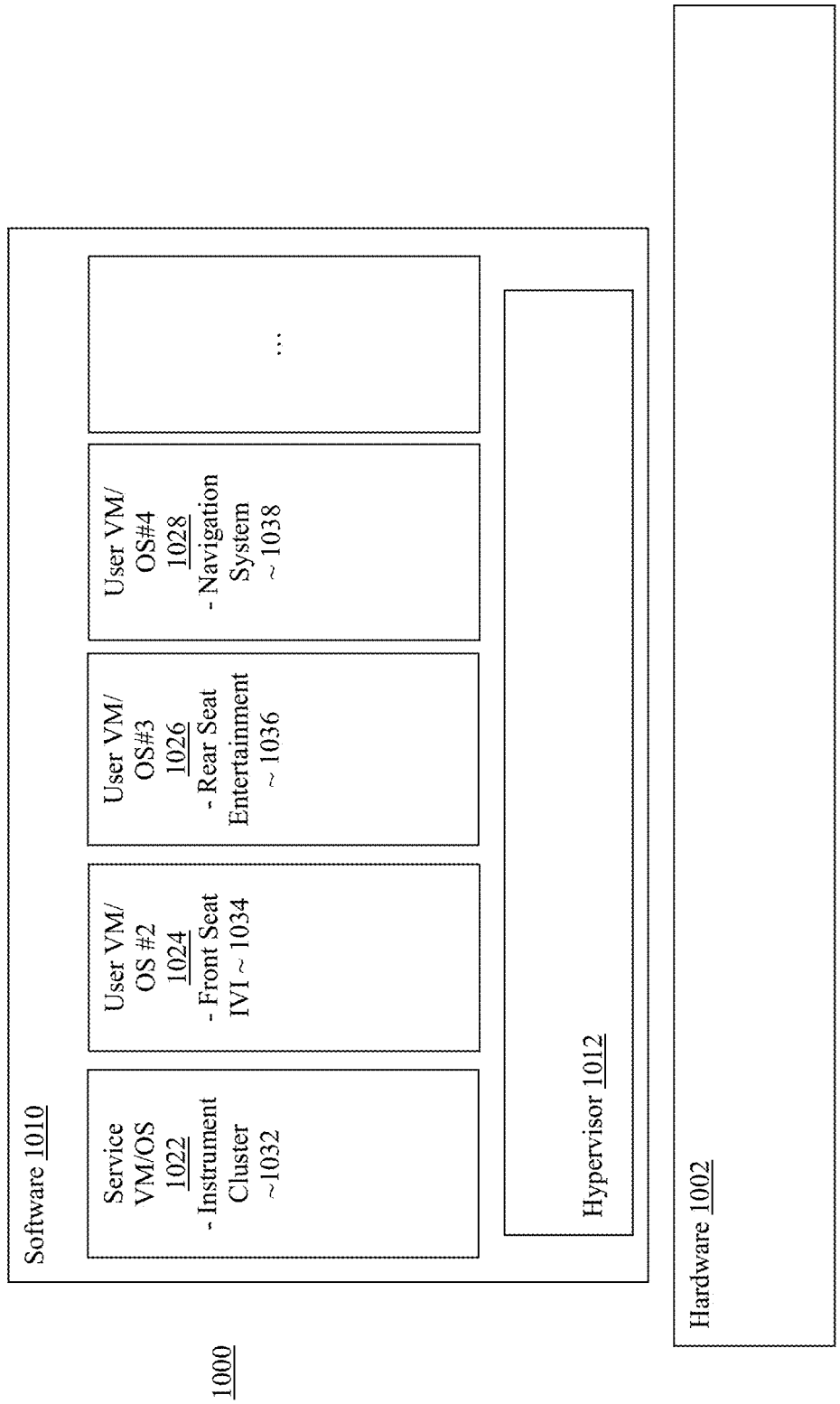
FIG. 10 illustrates a software component view of an example in-vehicle system formed with a UVCS, according to various embodiments.

Referring now to FIG. 10, wherein a software component view of an example in vehicle system formed with a UVCS, according to various embodiments, is illustrated. As shown, for the embodiments, in-vehicle system 1000, which could be formed with UVCS 300, 400, 500, 600 or 700, includes hardware 1002 and software 1010. Software 1010 includes hypervisor 1012 hosting a number of virtual machines (VMs) 1022-1028. Hypervisor 1012 is configured to host execution of VMs 1022-1028. In embodiments, hypervisor 1012 may also implement some or all of the functions described earlier for a system management controller of a UVCS module. The VMs 1022-1028 include a service VM 1022 and a number of user VMs 1024-1028. Service machine 1022 includes a service OS hosting execution of a number of instrument cluster applications 1032. User VMs 1024-1028 may include a first user VM 1024 having a first user OS hosting execution of front seat infotainment applications 1034, a second user VM 1026 having a second user OS hosting execution of rear seat infotainment applications 1036, a third user VM 1028 having a third user OS hosting execution of navigation subsystem 1038, incorporated with the travelers intent technology, and so forth.

Except for UVCS teachings of the present disclosure, software 1010 may otherwise be any one of a number of these elements known in the art. For example, hypervisor 1012 may be any one of a number of hypervisors known in the art, such as KVM, an open source hypervisor, Xen, available from Citrix Inc, of Fort Lauderdale, Fla, or VMware, available from VMware Inc of Palo Alto, Calif., and so forth. Similarly, service OS of service VM 1022 and user OS of user VMs 1024-1028 may be any one of a number of OS known in the art, such as Linux, available e.g., from Red Hat Enterprise of Raleigh, N.C., or Android, available from Google of Mountain View, Calif.

Figure 11:
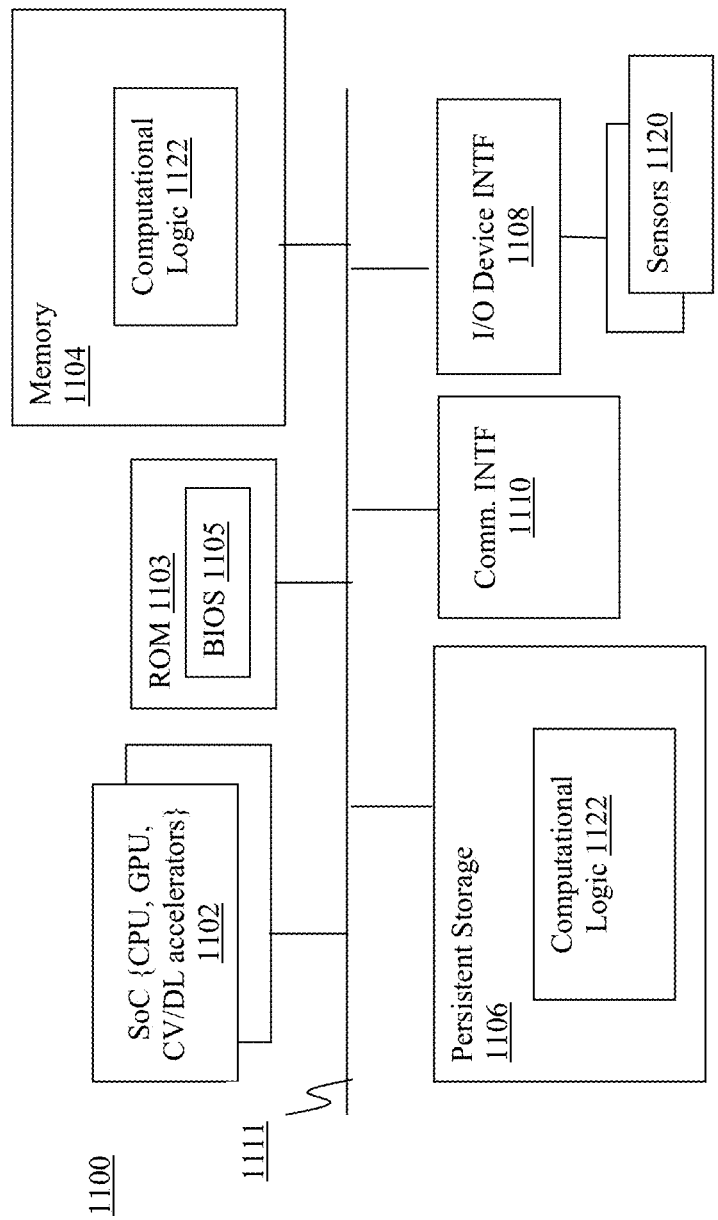
FIG. 11 illustrates a hardware component view of an example computing platform provided by a UVCS, according to various embodiments.

Referring now to FIG. 11, wherein a hardware component view of an example computing platform provided by a UVCS, according to various embodiments, is illustrated. As shown, computing platform 1100, which may be hardware 1002 of FIG. 10. Computing platform may be implemented with any one of UVCS 300, 400, 500, 600 or 700. For the illustrated embodiments, computing platform 1100 includes one or more system-on-chips (SoCs) 1102, ROM 1103 and system memory 1104. Each SoCs 1102 may include one or more processor cores (CPUs), one or more graphics processor units (GPUs), one or more accelerators, such as computer vision (CV) and/or deep learning (DL) accelerators. ROM 1103 may include basic input/output system services (BIOS) 1105. CPUs, GPUs, and CV/DL accelerators may be any one of a number of these elements known in the art. Similarly, ROM 1103 and BIOS 1105 may be any one of a number of ROM and BIOS known in the art, and system memory 1104 may be any one of a number of volatile storage devices known in the art.

Additionally, computing platform 1100 may include persistent storage devices 1106. Example of persistent storage devices 1106 may include, but are not limited to, flash drives, hard drives, compact disc read-only memory (CD-ROM) and so forth. Further, computing platform 1100 may include one or more input/output (I/O) interfaces 1108 to interface with one or more I/O devices, such as sensors 1120. Other example I/O devices may include, but are not limited to, display, keyboard, cursor control and so forth. Computing platform 1100 may also include one or more communication interfaces 1110 (such as network interface cards, modems and so forth). Communication devices may include any number of communication and I/O devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 1111, which may represent one or more buses. In the case of multiple buses, they may be bridged by one or more bus bridges (not shown).

Each of these elements may perform its conventional functions known in the art. In particular, ROM 1103 may include BIOS 1105 having a boot loader. System memory 1104 and mass storage devices 1106 may be employed to store a working copy and a permanent copy of the programming instructions implementing the operations associated with hypervisor 112 (including for some embodiments, functions associated with the system management controller of a UVCS module), service/user OS of service/user VM 1022-1028, components of navigation subsystem 1038, collectively referred to as computational logic 1122. The various elements may be implemented by assembler instructions supported by processor core(s) of SoCs 1102 or high-level languages, such as, for example, C, that can be compiled into such instructions.

Figure 12:
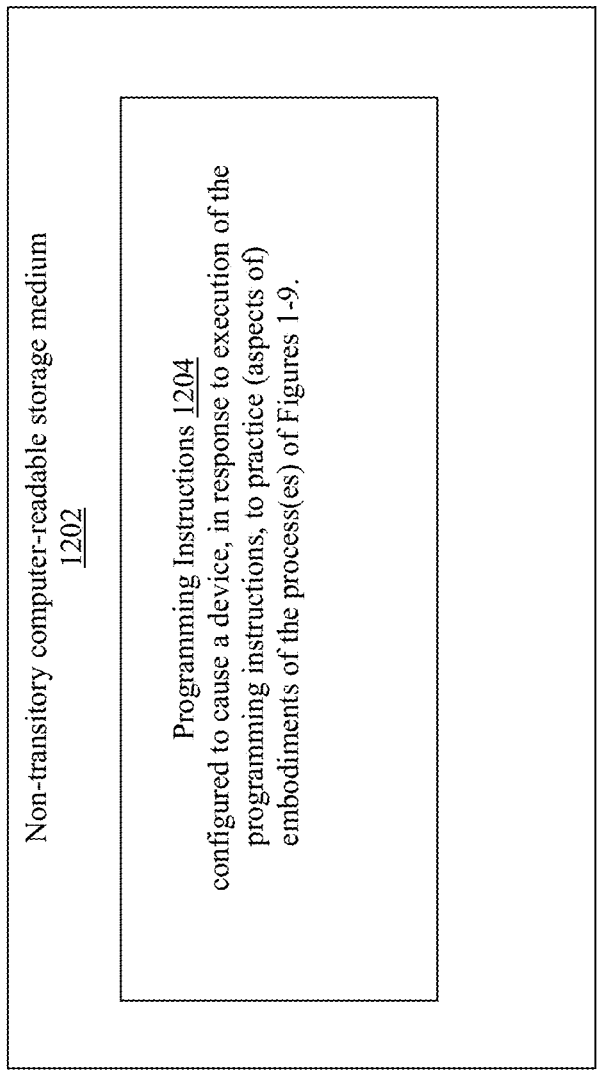
FIG. 12 illustrates a storage medium having instructions for practicing aspects of the methods described with references to FIGS. 1-8, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 12 illustrates an example computer-readable non-transitory storage medium that may be suitable for use to store instructions that cause an apparatus, in response to execution of the instructions by the apparatus, to practice selected aspects of the present disclosure described with references to FIGS. 1-8. As shown, non-transitory computer-readable storage medium 1202 may include a number of programming instructions 1204. Programming instructions 1204 may be configured to enable a device, e.g., computing platform 1100, in response to execution of the programming instructions, to implement (aspects of) hypervisor 112 (including for some embodiments, functions associated with the system management controller of a UVCS module), service/user OS of service/user VM 122-128, or components of navigation subsystem 1038. In alternate embodiments, programming instructions 1204 may be disposed on multiple computer-readable non-transitory storage media 1202 instead. In still other embodiments, programming instructions 1204 may be disposed on computer-readable transitory storage media 1202, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 is an apparatus for upgradable vehicular computing, comprising: an interconnect to mate a pluggable compute module with an in-vehicle compute hub disposed in a vehicle to form an upgradable vehicle compute system for the vehicle, the interconnect having a fixed section and a configurable section; wherein the fixed section includes a dynamic power delivery interface to deliver power from the in-vehicle compute hub to the pluggable compute module, and a management channel to facilitate a system management controller of the in-vehicle compute hub in managing the pluggable compute module; and wherein the configurable section includes a plurality of configurable input/output (I/O) interfaces to couple and facilitate inputs from one or more peripherals of the in-vehicle compute hub to one or more compute elements of the pluggable compute module, and outputs from the one or more compute elements of the pluggable compute module to the one or more peripherals of the in-vehicle compute hub.

Example 2 is the apparatus of example 1, wherein the management channel comprises a selected one of a Universal Asynchronous Receiver/Transmitter interface or a Universal Serial Bus interface.

Example 3 is the apparatus of example 1, wherein the plurality of configurable I/O interfaces include one or more serial I/O interfaces.

Example 4 is the apparatus of example 3, wherein the one or more serial I/O interfaces include a Peripheral Component Interconnect Express (PCIe) interface.

Example 5 is an apparatus for upgradable vehicular computing, comprising: a pluggable compute module having a central processing unit (CPU), one or more other compute elements, power input and supply circuitry, a housekeeping controller, and a configurable input/output (CIO) multiplexer, to mate with an in-vehicle compute hub disposed in a vehicle, through an interconnect, to form an upgradable vehicle compute system for the vehicle; wherein the power input and supply circuitry is to receive power from the in-vehicle compute hub, through the interconnect; the housekeeping controller is to communicate with the in-vehicle compute hub, through the interconnect, to enable the in-vehicle compute hub to manage the pluggable compute module; and the CIO multiplexor is configurable to multiplex inputs from the in-vehicle compute hub or to multiplex outputs to the in-vehicle compute hub, through the interconnect in accordance with one or more I/O protocols.

Example 6 is the apparatus of example 5, wherein the housekeeping controller is arranged to negotiate with the vehicle compute hub, via the interconnect, during an initial pairing of the pluggable compute module and the vehicle compute hub, a power delivery contract.

Example 7 is the apparatus of example 6, wherein the power input and supply circuitry includes a power monitor to monitor the power received from the in-vehicle compute hub, through the interconnect, and forward results of the monitoring to the housekeeping controller.

Example 8 is the apparatus of example 6, wherein the housekeeping controller is to further regulate delivery of the received power to the CPU and the one or more other compute elements or power consumption by the CPU and the one or more other compute elements, based at least in part on the negotiated power delivery contract and results of monitoring the received power.

Example 9 is the apparatus of example 6, wherein the housekeeping controller is to further regulate delivery of the received power to the CPU and the one or more other compute elements or power consumption by the CPU and the one or more other compute elements, based at least in part on an operational context of the vehicle.

Example 10 is the apparatus of example 6, wherein the housekeeping controller is to regulate power consumption by the CPU and the one or more other compute elements by selectively initiating sleep states, lowering clock frequencies, or powering off, the CPU or the one or more other compute elements.

Example 11 is the apparatus of example 5, wherein the housekeeping controller is arranged to abstract power and sleep management related signals of the CPU and the one or more other compute elements, and communicate power and sleep management related information of the CPU and the one or more other compute elements to the in-vehicle compute hub, through the interconnect, in a form independent of the specific CPU and the one or more other compute elements included with the pluggable compute module.

Example 12 is the apparatus of example 5, wherein the housekeeping controller is arranged to channel sideband signals from the CPU or the one or more other compute elements to peripherals of the in-vehicle compute hub, through the interconnect.

Example 13 is the apparatus of example 5, wherein the housekeeping controller is arranged to facilitate authentication of the pluggable compute module and the in-vehicle compute hub to each other, through the interconnect.

Example 14 is the apparatus of example 5, wherein the housekeeping controller is arranged to facilitate an implementation of a vehicle functional safety protocol between the pluggable compute module and the in-vehicle compute hub, through the interconnect.

Example 15 is the apparatus of example 5, wherein the one or more I/O protocols includes one or more I/O protocols selected from a Universal Serial Bus protocol, a Peripheral Component Interface Express protocol, a High Definition Multi-Media Interface protocol, or a Display Port protocol.

Example 16 is the apparatus of any one of example 5-15, wherein the pluggable compute module further comprises memory, a hardware accelerator, mass storage, or a communication unit.

Example 17 is an apparatus for upgradable vehicular computing, comprising: an in-vehicle compute hub to be disposed in a vehicle, and having a power supply, a system management controller, and a plurality of peripheral components, to mate with a pluggable compute module, through an interconnect, to form an upgradable vehicle compute system for the vehicle; wherein the power supply is to supply power to the pluggable compute module, through the interconnect; the system management controller is to communicate with the pluggable compute module, through the interconnect, to manage the pluggable compute module; and the plurality of peripheral components are to provide inputs to the pluggable compute module or to receive outputs from the pluggable compute module, through the interconnect.

Example 18 is the apparatus of example 17, wherein the in-vehicle compute hub further includes reverse polarity protection or spike suppression circuitry to regulate the supply of power to the pluggable compute module, through the interconnect.

Example 19 is the apparatus of example 17, wherein the system management controller is arranged to receive communication on power and sleep management related information for compute elements of the pluggable compute module, from the pluggable compute module, through the interconnect, in an abstracted form, independent of the specific compute elements included with the pluggable compute module.

Example 20 is the apparatus of example 17, wherein the system management controller is arranged to receive channel sideband signals for the peripheral components, from compute elements of the pluggable computer module, through the interconnect.

Example 21 is the apparatus of example 17, wherein the system management controller is arranged to facilitate authentication of the pluggable compute module and the in-vehicle compute hub to each other, through the interconnect.

Example 22 is the apparatus of example 17, wherein the system management controller is arranged to facilitate an implementation of a vehicle functional safety protocol between the pluggable compute module and the in-vehicle compute hub, through the interconnect.

Example 23 is the apparatus of any one of example 17-22, wherein the peripheral components include one or more audio amplifiers, cameras, network interfaces, display interfaces, or communication interfaces.

Example 24 is a method for upgradeable vehicular computing, comprising: disposing an in-vehicle compute hub in a vehicle; and providing an interconnect to the in-vehicle compute hub to removably receive a pluggable compute module to form an upgradeable vehicle compute system for the vehicle, the interconnect having a fixed section and a configurable section; wherein the fixed section includes a dynamic power delivery interface to deliver power from the in-vehicle compute hub to the pluggable compute module, and a management channel to facilitate a system management controller of the in-vehicle compute hub in managing the pluggable compute module; and wherein the configurable section includes a plurality of configurable input/output (I/O) interfaces to couple and facilitate inputs from one or more peripherals of the in-vehicle compute hub to one or more compute elements of the pluggable compute module, and outputs from the one or more compute elements of the pluggable compute module to the one or more peripherals of the in-vehicle compute hub.

Example 25 is the apparatus of example 24, further comprising providing, and mating the pluggable compute module with the in-vehicle compute hub via the interconnect to form upgradeable vehicle compute system; and configuring a configurable I/O multiplexor to selectively establish one or more I/O channels of one or more I/O protocols between the one or more compute elements of the pluggable compute module and the one or more peripherals of the in-vehicle compute hub.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for upgradable vehicular computing, comprising:
    an interconnect to mate a pluggable compute module with an in-vehicle compute hub disposed in a vehicle to form an upgradable vehicle compute system for the vehicle, the interconnect having a fixed section and a configurable section;
    wherein the fixed section includes a dynamic power delivery interface to deliver power from the in-vehicle compute hub to the pluggable compute module, and a management channel to facilitate a system management controller of the in-vehicle compute hub in managing the pluggable compute module; and
    wherein the configurable section includes a plurality of configurable input/output (I/O) interfaces to couple and facilitate inputs from one or more peripherals of the in-vehicle compute hub to one or more compute elements of the pluggable compute module, and outputs from the one or more compute elements of the pluggable compute module to the one or more peripherals of the in-vehicle compute hub.

2. The apparatus of claim 1, wherein the management channel comprises a selected one of a Universal Asynchronous Receiver/Transmitter interface or a Universal Serial Bus interface.

3. The apparatus of claim 1, wherein the plurality of configurable I/O interfaces include one or more serial I/O interfaces.

4. The apparatus of claim 3, wherein the one or more serial I/O interfaces include a Peripheral Component Interconnect Express (PCIe) interface.

5. An apparatus for upgradable vehicular computing, comprising:
    a pluggable compute module having a central processing unit (CPU), one or more other compute elements, power input and supply circuitry, a housekeeping controller, and a configurable input/output (CIO) multiplexor, wherein the pluggable compute module is arranged to mate with an in-vehicle compute hub disposed in a vehicle, through an interconnect, to form an upgradable vehicle compute system for the vehicle;
    wherein the power input and supply circuitry is to receive power from the in-vehicle compute hub, through the interconnect; the housekeeping controller is to communicate with the in-vehicle compute hub, through the interconnect, to enable the in-vehicle compute hub to manage the pluggable compute module; and the CIO multiplexor is configurable to multiplex inputs from the in-vehicle compute hub or to multiplex outputs to the in-vehicle compute hub, through the interconnect in accordance with one or more I/O protocols.

6. The apparatus of claim 5, wherein the housekeeping controller is arranged to negotiate with the in-vehicle compute hub, via the interconnect, during an initial pairing of the pluggable compute module and the in-vehicle compute hub, a power delivery contract.

7. The apparatus of claim 6, wherein the power input and supply circuitry includes a power monitor to monitor the power received from the in-vehicle compute hub, through the interconnect, and forward results of the monitoring to the housekeeping controller.

8. The apparatus of claim 6, wherein the housekeeping controller is to further regulate delivery of the received power to the CPU and the one or more other compute elements or power consumption by the CPU and the one or more other compute elements, based at least in part on the negotiated power delivery contract and results of monitoring the received power.

9. The apparatus of claim 6, wherein the housekeeping controller is to further regulate delivery of the received power to the CPU and the one or more other compute elements or power consumption by the CPU and the one or more other compute elements, based at least in part on an operational context of the vehicle.

10. The apparatus of claim 6, wherein the housekeeping controller is to regulate power consumption by the CPU and the one or more other compute elements by selectively initiating sleep states, lowering clock frequencies, or powering off the CPU or the one or more other compute elements.

11. The apparatus of claim 5, wherein the housekeeping controller is arranged to abstract power and sleep management related signals of the CPU and the one or more other compute elements, and communicate power and sleep management related information of the CPU and the one or more other compute elements to the in-vehicle compute hub, through the interconnect, in a form independent of the CPU and the one or more other compute elements included with the pluggable compute module.

12. The apparatus of claim 5, wherein the housekeeping controller is arranged to channel sideband signals from the CPU or the one or more other compute elements to peripherals of the in-vehicle compute hub, through the interconnect.

13. The apparatus of claim 5, wherein the housekeeping controller is arranged to facilitate authentication of the pluggable compute module and the in-vehicle compute hub to each other, through the interconnect.

14. The apparatus of claim 5, wherein the housekeeping controller is arranged to facilitate an implementation of a vehicle functional safety protocol between the pluggable compute module and the in-vehicle compute hub, through the interconnect.

15. The apparatus of claim 5, wherein the one or more I/O protocols includes one or more I/O protocols selected from a Universal Serial Bus protocol, a Peripheral Component Interface Express protocol, a High Definition Multi-Media Interface protocol, or a Display Port protocol.

16. The apparatus of claim 5, wherein the pluggable compute module further comprises memory, a hardware accelerator, mass storage, or a communication unit.

17. An apparatus for upgradable vehicular computing, comprising:
an in-vehicle compute hub to be disposed in a vehicle, and having a power supply, a system management controller, and a plurality of peripheral components, wherein the in-vehicle compute hub is arranged to mate with a pluggable compute module having one or more processors, through an interconnect, to form an upgradable vehicle compute system for the vehicle, to execute one or more vehicular applications with the one or more processors in the pluggable compute module;
wherein the power supply is to supply power to the pluggable compute module, through the interconnect; the system management controller is to communicate with the pluggable compute module, through the interconnect, to manage the pluggable compute module; and the plurality of peripheral components are to provide inputs to the pluggable compute module or to receive outputs from the pluggable compute module, through the interconnect.

18. The apparatus of claim 17, wherein the in-vehicle compute hub further includes reverse polarity protection or spike suppression circuitry to regulate the supply of power to the pluggable compute module, through the interconnect.

19. The apparatus of claim 17, wherein the system management controller is arranged to receive communication on power and sleep management related information for compute elements of the pluggable compute module, from the pluggable compute module, through the interconnect, in an abstracted form, independent of the specific compute elements included with the pluggable compute module.

20. The apparatus of claim 17, wherein the system management controller is arranged to receive channel sideband signals for the peripheral components, from compute elements of the pluggable compute module, through the interconnect.

21. The apparatus of claim 17, wherein the system management controller is arranged to facilitate authentication of the pluggable compute module and the in-vehicle compute hub to each other, through the interconnect.

22. The apparatus of claim 17, wherein the system management controller is arranged to facilitate an implementation of a vehicle functional safety protocol between the pluggable compute module and the in-vehicle compute hub, through the interconnect.

23. The apparatus of claim 17, wherein the peripheral components include one or more audio amplifiers, cameras, network interfaces, display interfaces, or communication interfaces.

24. A method for upgradeable vehicular computing, comprising:
disposing an in-vehicle compute hub in a vehicle; and
providing an interconnect to the in-vehicle compute hub to removably receive a pluggable compute module to form an upgradeable vehicle compute system for the vehicle, the interconnect having a fixed section and a configurable section;
wherein the fixed section includes a dynamic power delivery interface to deliver power from the in-vehicle compute hub to the pluggable compute module, and a management channel to facilitate a system management controller of the in-vehicle compute hub in managing the pluggable compute module; and
wherein the configurable section includes a plurality of configurable input/output (I/O) interfaces to couple and facilitate inputs from one or more peripherals of the in-vehicle compute hub to one or more compute elements of the pluggable compute module, and outputs from the one or more compute elements of the pluggable compute module to the one or more peripherals of the in-vehicle compute hub.

25. The method of claim 24, further comprising:
providing, and mating the pluggable compute module with the in-vehicle compute hub via the interconnect to form the upgradeable vehicle compute system; and
configuring a configurable I/O multiplexor to selectively establish one or more I/O channels of one or more I/O protocols between the one or more compute elements of the pluggable compute module and the one or more peripherals of the in-vehicle compute hub.

* * * * *